United States Patent [19]

Yoshida et al.

[11] Patent Number: 4,561,106

[45] Date of Patent: Dec. 24, 1985

[54] CHARACTER RECOGNITION PROCESS AND APPARATUS

[75] Inventors: Masumi Yoshida; Takeshi Masui, both of Kawasaki, Japan

[73] Assignee: Fujitsu Limited, Kawasaki, Japan

[21] Appl. No.: 731,612

[22] Filed: May 7, 1985

Related U.S. Application Data

[63] Continuation of Ser. No. 303,593, Sep. 18, 1981, abandoned, which is a continuation of Ser. No. 165,335, Jul. 2, 1980, abandoned, which is a continuation of Ser. No. 917,541, Jun. 21, 1978, abandoned, which is a continuation-in-part of Ser. No. 727,513, Sep. 28, 1976, abandoned.

[30] Foreign Application Priority Data

Sep. 29, 1975 [JP] Japan .................................. 50-117365

[51] Int. Cl.$^4$ .......................... G06K 9/54; G06K 9/60
[52] U.S. Cl. ........................................ 382/49; 382/55; 382/25
[58] Field of Search ....................... 382/22, 23, 25, 26, 382/48, 49, 51, 52, 54, 55, 19, 41

[56] References Cited

U.S. PATENT DOCUMENTS

| | | | |
|---|---|---|---|
| 3,106,699 | 10/1963 | Kamentsky | 382/27 |
| 3,290,650 | 11/1966 | Bailey et al. | 382/26 |
| 3,541,511 | 11/1970 | Genchi et al. | 382/25 |
| 3,668,637 | 6/1972 | Sakai et al. | 382/55 |
| 3,766,520 | 10/1973 | Patterson | 382/25 |
| 3,860,909 | 1/1975 | Demonte | 382/25 |
| 3,999,161 | 12/1976 | van Bilzem et al. | 382/25 |
| 4,105,998 | 8/1978 | Yoshida et al. | 382/22 |
| 4,163,213 | 7/1979 | Nadler | 382/26 |

Primary Examiner—John C. Martin
Assistant Examiner—Michael D. Parker
Attorney, Agent, or Firm—Staas & Halsey

[57] ABSTRACT

Disclosed herein is a character recognition process which extracts white regions surrounded by strokes of character pattern information and recognizes characters by determining the directions in which said white regions are opened. The process is provided by processing apparatus, for conversion of mesh information, disposed so as to convert a white mesh point present between two black mesh points to a black mesh point during one scanning period for scanning said character pattern information in one direction. The directions of openings of the white regions are determined based on the converted character pattern information obtained by the processing apparatus.

2 Claims, 18 Drawing Figures

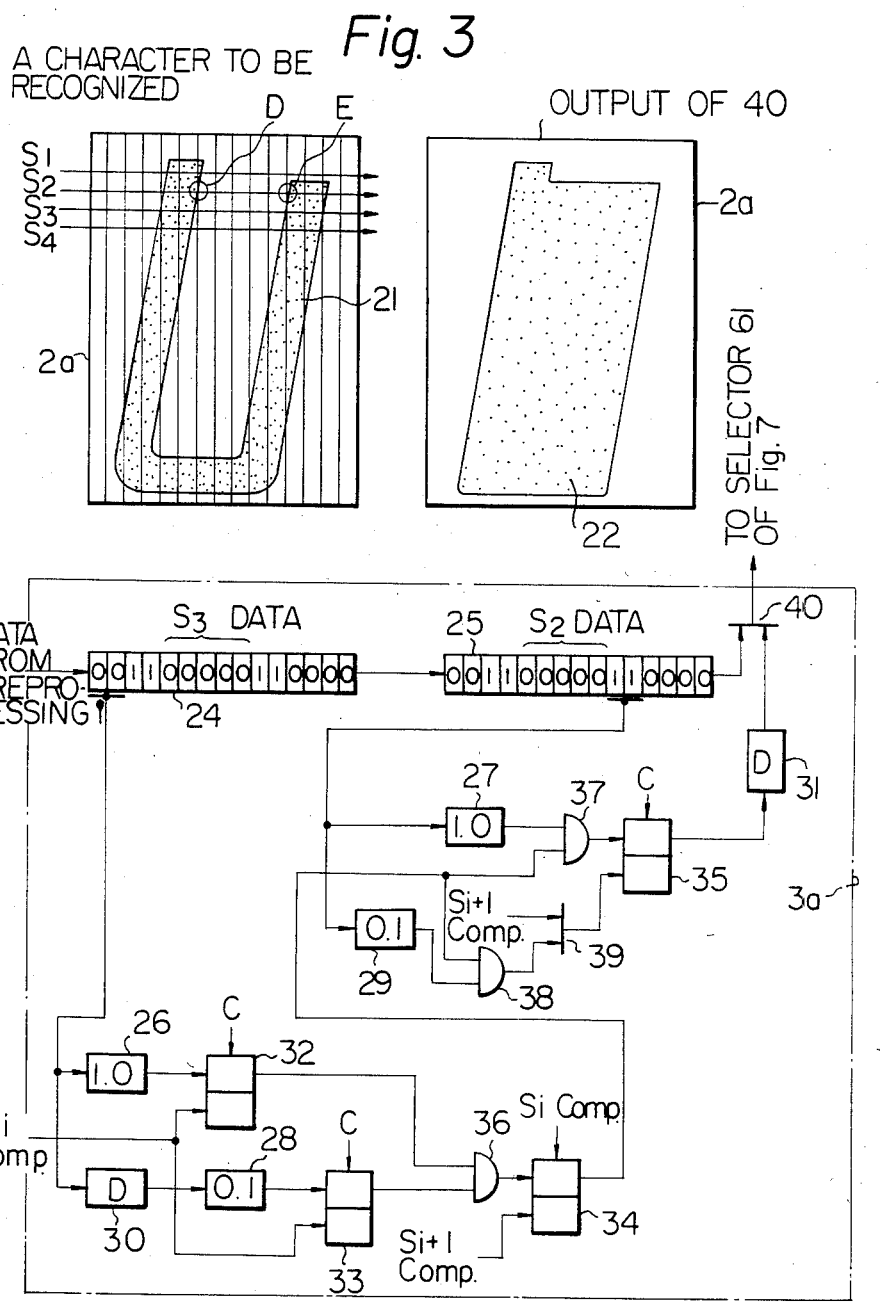

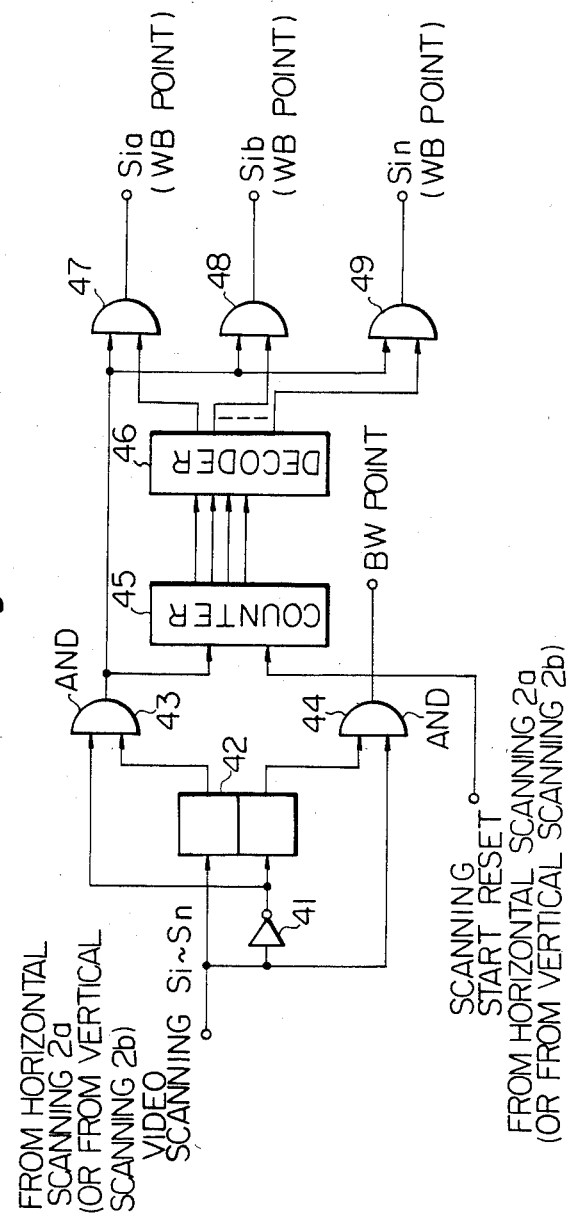

Fig. 5A   Fig. 5B   Fig. 5C
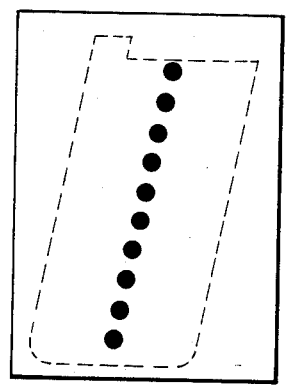 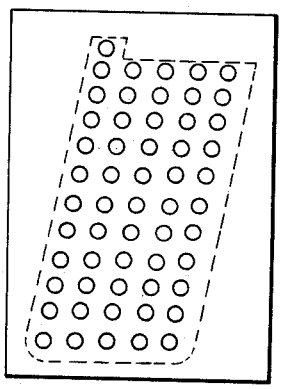 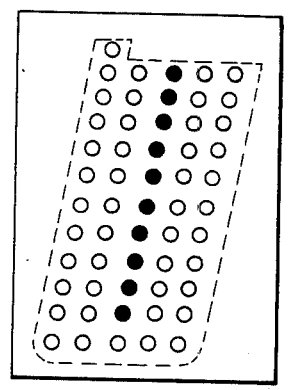
Fig. 6
(a) START POINT 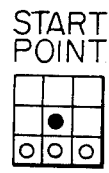
(b) MID POINT 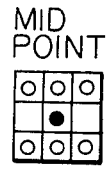
(c) END POINT 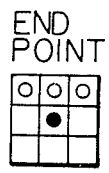
(d) START CLOSE 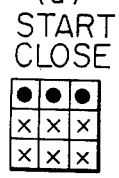
(e) END CLOSE 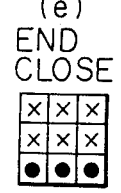

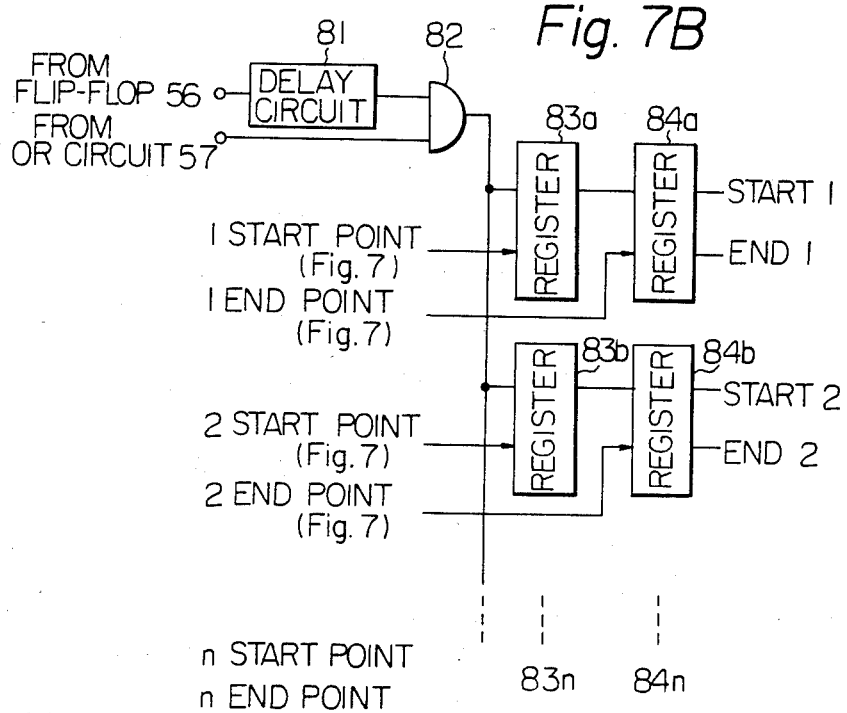
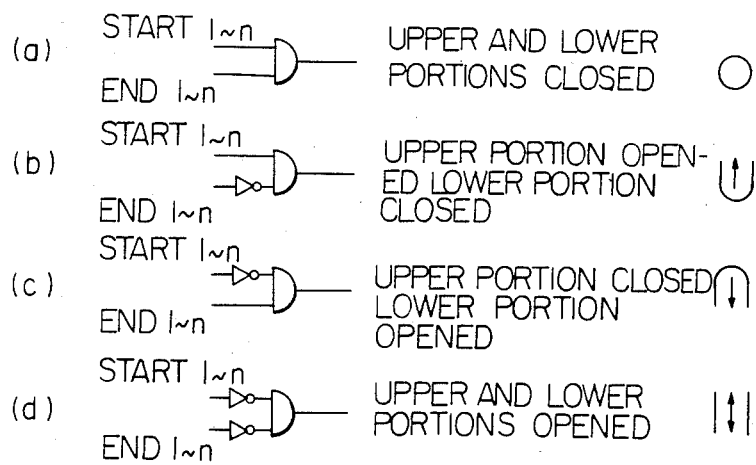

CHARACTER RECOGNITION PROCESS AND APPARATUS

This is a continuation of co-pending application Ser. No. 303,593, filed on 9/18/81, which is a continuation of application Ser. No. 165,335 filed July 2, 1980, which is a continuation of application Ser. No. 917,541 filed June 21, 1978, which is a continuation-in-part of application Ser. No. 727,513, filed Sept. 28, 1976 all now abandoned.

BACKGROUND OF THE INVENTION

1. Field of the Invention

The present invention relates to a character recognition process. More particularly, the invention relates to a character recognition apparatus which recognizes a character by extracting white regions surrounded by strokes of character pattern information, to be recognized, and examines the directions of openings of the white regions to thereby recognize characters.

2. Description of the Prior Art

In character recognition, the characteristic of regions other than character regions in the character pattern information to be recognized, namely the white regions, are examined so as to determine the general characteristics of the character pattern and it is important to determine in which direction the white region is opened. However, determination of the direction of opening of the white region is often influenced by deformation or inclination of the character to be recognized and, especially in the case of hand-printed characters, it is necessary to take measures for reducing or obviating this influence as much as possible.

SUMMARY OF THE INVENTION

It is a primary object of the present invention to provide a character recognition process and apparatus therefor which reduces or obviates the influence caused by deformation or inclination of the character to be recognized.

In accordance with the present invention, there is provided a character recognition apparatus which extracts white regions surrounded by strokes of character pattern information and recognizes characters by determining the directions in which the white regions are opened. According to the present invention, the apparatus is characterized in that processing means for conversion of mesh information is disposed so as to convert a white mesh point present between two black mesh points to a black mesh point during one scanning period for scanning said character pattern information in one direction, and; the directions of the openings of the white regions are determined based on the converted character pattern information obtained by said information processing means.

Further features and advantages of the present invention will be apparent from the ensuing description with reference to the accompanying drawings; to which, however, the scope of the invention is in no way limited.

BRIEF DESCRIPTION OF THE DRAWINGS

FIG. 3 is a diagram illustrating the processing means for conversion of mesh information according to the present invention;

FIGS. 4A and 4B are diagrams illustrating the circuit of the processing means;

FIGS. 5A, 5B and 5C are patterns appearing in the diagram shown in FIG. 4B;

FIG. 6 shows window patterns which are used for detecting the direction of the openings of the white regions;

FIGS. 7A, 7B and 7C are diagrams illustrating the circuit which detects the directions of the openings of the white regions, and;

DESCRIPTION OF THE PREFERRED EMBODIMENT

Figure 1:
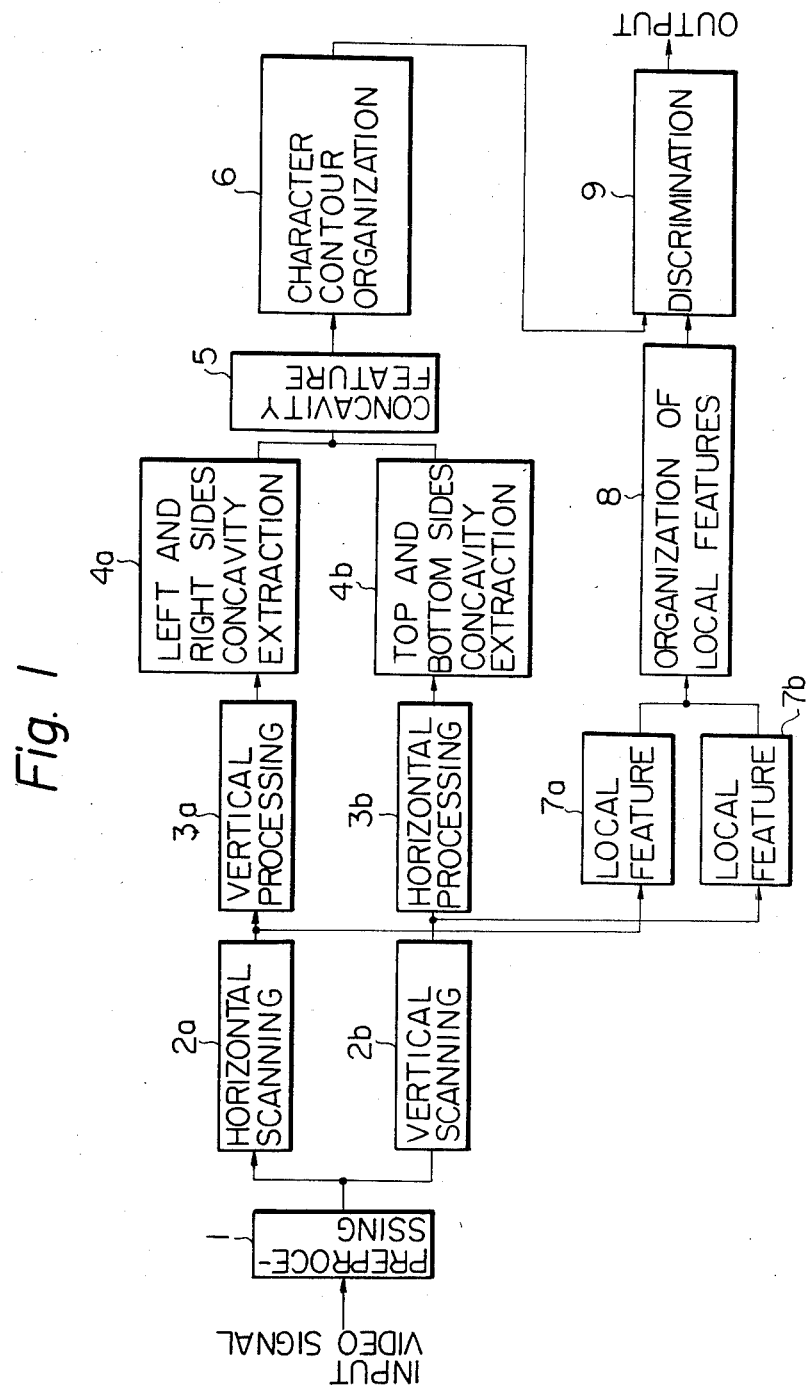
FIG. 1 is a diagram illustrating the system of character recognition according to the present invention.

Referring to FIG. 1, an input video signal is supplied to a preprocessing stage 1, where the noise signals or parasitic signals included in the input video signal are removed. After the preprocessing stage 1, the video signal is supplied to a horizontal scanning stage 2a and a vertical scanning process 2b. After the horizontal scanning stage 2a and the vertical scanning stage 2b, the signals are supplied to a vertical processing stage 3a and a horizontal processing stage 3b so as to convert the information of a white mesh point between the information of two black mesh points to the information of a black mesh point. After the vertical and horizontal processing stages 3a and 3b, the signals are supplied to a left and right side concavity extraction stage 4a and a top and bottom side concavity extraction stage 4b so as to determine the directions of the openings of the white regions. Based on the stages 4a and 4b, a concavity feature stage 5 determines the concavity features of the character and the character contour is formed in a character contour organization stage 6. On the other hand, after the horizontal scanning stage 2a and the vertical scanning stage 2b, the signals are also supplied to local feature stages 7a and 7b, respectively, and the local features of the signal are formed in a local features organization stage 8. Based on the results of stages 6 and 8, the character is discriminated in the discrimination stage 9 and the result obtained is output.

Referring to the diagram shown in FIG. 1, the present invention relates to the processes which are effected in stages 2a through 4a and stages 2b through 4b. Therefore, these process will now be explained in detail with reference to FIGS. 2A, 2B and 2C.

Figure 2A:
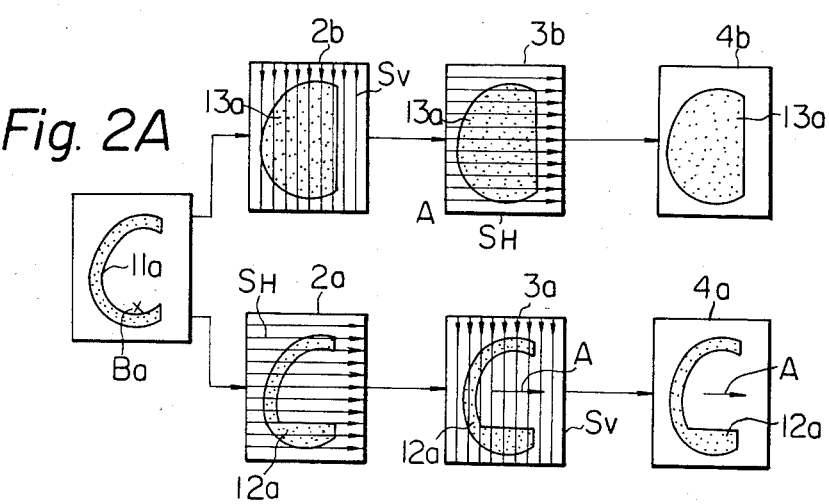
FIG. 2A, 2B and 2C are diagrams illustrating the concept of character recognition according to the present invention.
Figure 2B:
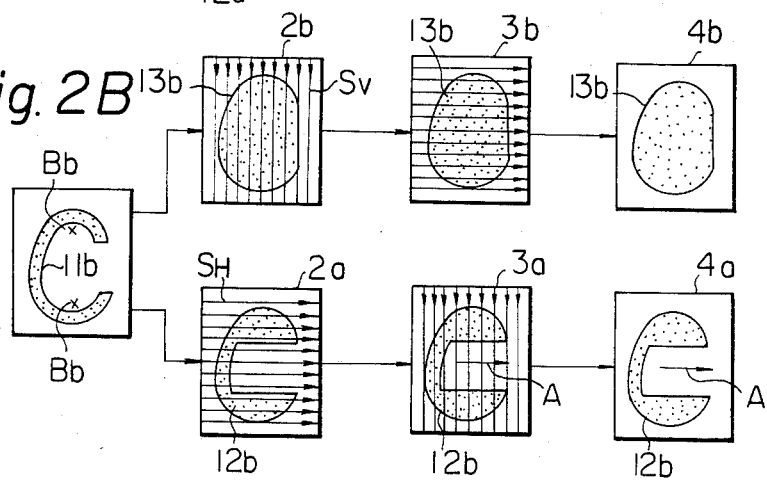
Figure 2C:
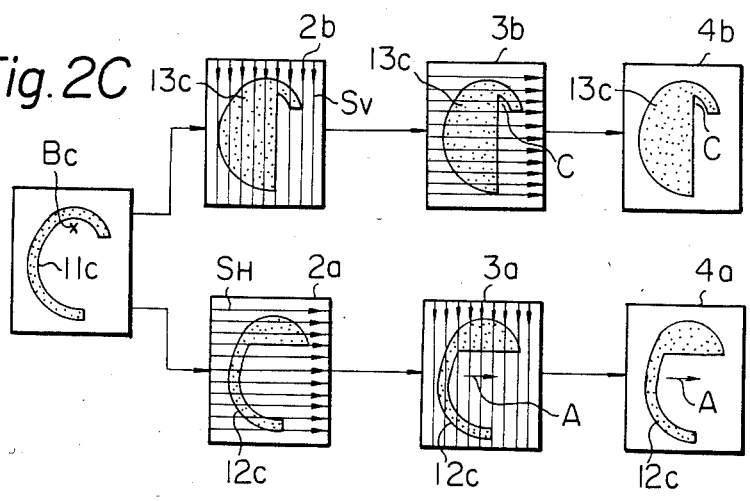

Referring to FIGS. 2A to 2C, reference numerals 11a, 11b and 11c each represent a modification of the character "C", and reference numerals 12a, 12b and 12c each denote character pattern information which has been converted with respect to the horizontal direction and obtained during the horizontal scanning according to the processing of the present invention. Reference numerals 13a, 13b and 13c each represent character pattern information which has been converted with respect to the vertical direction and obtained during the vertical scanning according to the processing of the present invention. Symbols SH and SV represent horizontal scannings (or scanning lines) and vertical scannings (or scanning lines), respectively.

In the present invention, if the character to be recognized is "C" and has, for example, a shape 11a, 11b or 11c, it is horizontally scanned after the preliminary processing in stage 1. During this one scanning, a black mesh point appears, then a white mesh point or white mesh points appear, and a black mesh point appears next. A conversion of the white mesh point or points to a black mesh point or black mesh points is performed at every scanning. As a result, a character pattern 12a, 12b or 12c which has been converted with respect to the horizontal direction is obtained. Then, the character 11a, 11b or 11c is vertically scanned. During every one of the vertical scanning lines, a white mesh point or white mesh points present between two black mesh points are converted to a black mesh point or black mesh points. As a result, a character pattern 13a, 13b or 13c which has been converted with respect to the vertical direction is obtained.

In the present invention, the character pattern 12a, 12b or 12c which has been converted with respect to the horizontal direction is vertically scanned at the subsequent recognizing stage, and the character pattern 13a, 13b or 13c which has been converted with respect to the vertical direction is horizontally scanned at the subsequent recognizing processing stage.

By this recognion processing, as shown in FIGS. 2A to 2C, the direction of the opening (the direction indicated by arrow A in the drawing) of the white region in the character pattern 12a, 12b or 12c is detected and determined. Namely, the same opening direction A is extracted as the characterisitc of the character "C" irrespective of modifications or inclinations. Characters 11a, 11b and 11c are accompanied by shadows Ba, Bb and Bc, respectively, formed by the strokes. However, as will be understood from the drawings, these shadows are removed and extraction of the opening direction A is not influenced by the presence of such shadow. Of course, in the case of the character 11C, a slightly concave C sometimes appears in the pattern information 13c. However, this concave C is much smaller in size than the character to be recognized and can be neglected. Accordingly, the concave C is never recognized as one characteristic.

The principle of the processing apparatus of the present invention for obtaining the above-mentioned horizontally converted character pattern 12a, 12b or 12c or the above-mentioned vertically converted character pattern 13a, 13b or 13c is illustrated in FIG. 3. In FIG. 3, reference numeral 21 represents a character (or character pattern information) to be recognized and symbols $S_1$, $S_2$, $S_3$ . . . denote horizontal scanning (or scanning lines). Reference numerals 24 and 25 represent shift registers in which data corresponding to the respective scanning lines is stored, reference numerals 26 and 27 each represent a circuit for detecting bit pattern "1, 0" and reference numerals 28 and 29 each represent a circuit for detecting bit pattern "0, 1". Delay circuits 30 and 31 are provided to effect the matching of timings. Reference numeral 32 represents a flip-flop for detecting bit pattern "1, 0" and reference numeral 33 represents a flip-flop for detecting bit pattern "0, 1". Reference numeral 34 represents a flip-flop for detecting bit patterns "1, 0" and "0, 1" which indicates that patterns "1, 0", . . . "0, 1" are generated during one scanning. Reference numeral 35 represents a flip-flop which forcibly sets the output bit of the shift register 25 to logical "1" when it is actuated. Reference numerals 36 to 38 each represent an and-circuit and reference numerals 39 and 40 each represent an or-circuit. Symbol "Si Comp." represents a signal giving logical "1" when scanning Si is completed. More specifically, in the embodiment shown in the drawing, "Si Comp." represents a signal giving logical "1" when scanning $S_3$ is completed. Symbol "Si+1 Comp." represents a signal giving logical "1" when scanning Si+1 is completed. More specifically, in the embodiment shown in the drawing, "Si+1 Comp." represents a signal giving logical "1" when scanning $S_4$ is completed.

FIG. 3 illustrates the state where scannings $S_2$ and $S_3$ are completed. As shown in 2a of FIG. 3, while horizontal scanning $S_2$ is being carried out, black mesh points and white mesh points present on this scanning line are successively set in the shift register 24. When bit pattern "1, 0" corresponding to point D in 2a of FIG. 3 is put in, the "1, 0" bit pattern-detecting circuit 26 detects this bit pattern "1, 0" and the flip-flop 32 is set. Then, when bit pattern "0, 1" corresponding to point E in the drawing is put in, this bit pattern "0, 1" is detected by the "0, 1" bit pattern-detecting circuit 28 and the flip-flop 33 is set. As a result, when this scanning $S_2$ is completed, the flip-flop 34 is set through the and-circuit 36. This means that bit patterns "1, 0", . . . "0, 1" are present in scanning $S_2$.

At the subsequent stage where scanning $S_3$ is carried out, data corresponding to this scanning $S_3$ are set in the shift register 24, and sumiltaneously, data corresponding to scanning $S_2$ are successively transferred to the shift register 25. While the data corresponding to scanning $S_2$ are shifted in the shift register, the bit pattern "1, 0" corresponding to the above point D is detected by the "1, 0" bit pattern-detecting circuit 27 and hence, the flip-flop 35 is set through the and-circuit 37. As a result, while the bit pattern "1, 0" corresponding to the point D and subsequent patterns are put out from the shift register 25, the output is forcibly converted to logical "1". Then, when the bit pattern "0, 1" corresponding to the point E is shifted, the flip-flop 35 is reset through the "0, 1" bit pattern-detecting circuit 29, the AND circuit 38 and the OR circuit 39. Namely, at the stage where the bit pattern "1, 0" corresponding to the point E and subsequent patterns are put out from the shift register 25, the above process of forcibly converting the output to logical "1" is stopped and the output from the shift register 25 is directly put out from the or-circuit 40.

The above procedures are repeated while each horizontal scanning is advanced, and the character pattern information 21 shown in 2a of FIG. 3 is supplied to a selector 61 of FIG. 7 which will be explained in detail hereafter.

In the present invention, the same processing as mentioned above is carried out with respect to vertical scanning as in the case of horizontal scanning, and a vertically converted character pattern such as 13a, 13b or 13c, shown in FIGS. 2A to 2C, is obtained. Then, the recognition processing is carried out in the same manner as described above with reference to FIGS. 2A to 2C.

The recognition processing according to the present invention can be performed by using any of the known means so far as the opening direction of the white region surrounded by character strokes can be extracted from the converted character pattern information. For example, when scanning is carried out in the same manner as shown in FIGS. 2A to 2C, there may be adopted a processing means capable of counting the number of black mesh points on the scanning lines and examining the direction of opening of the white region surrounded by these black mesh points.

Figure 4B:
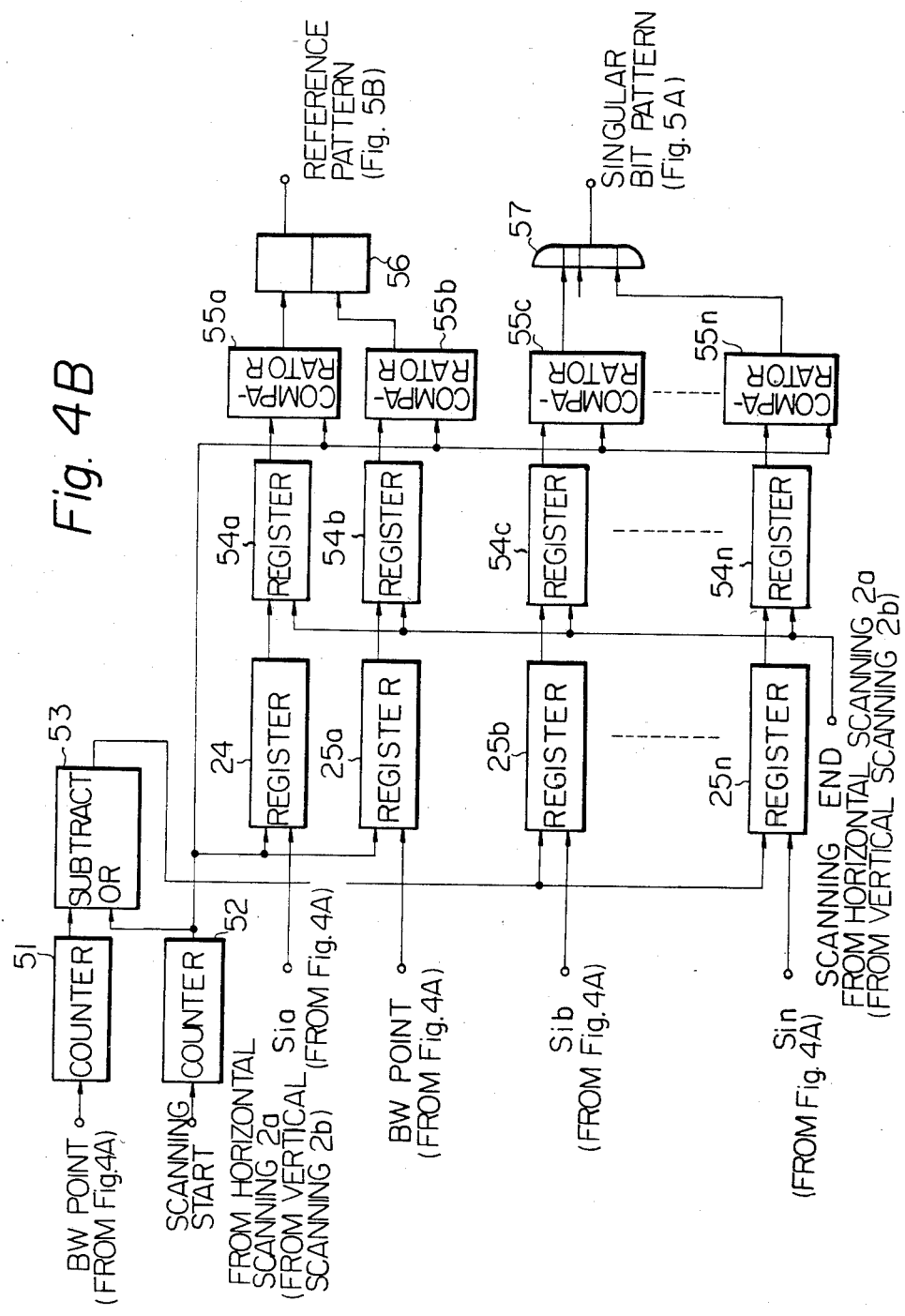

FIGS. 4A and 4B are diagrams illustrating one embodiment of the circuit of the processing means. FIG. 4A receives the video scanning digital signal Si (that is, $S_1, S_2, S_3, \ldots$ or $S_n$) as shown in FIG. 3 from horizontal scanning 2a, and outputs white to black changing points Sia, Sib, Sin at its output terminals. Referring to FIG. 4A, reference numeral 41 indicates an inverter circuit, reference numeral 42 is a flip-flop circuit, reference numerals 43, 44 and 47 through 49 are AND circuits, reference numeral 45 is a counter for counting a number of mesh, and reference numeral 46 is a decoder for decoding the positions of the white to black changing points. The counter 45 is reset by a scanning start reset signal from the horizontal scanning 2a and the AND circuit 44 is provided for outputting a black to white changing point signal. The outputs Sia, Sib, ... Sin of the AND circuits 47 through 49 are supplied to registers 24, 25b, ..., 25n (shown in FIG. 4B), respectively. The output of the AND circuit 44, that is, the black to white changing point signal, is supplied to a first counter 51 and the scanning start signal is supplied to a second counter 52 from the horizontal scanning 2a.

Referring to FIG. 4B, reference numeral 53 is a subtractor, reference numerals 54a through 54n are registers, reference numerals 55a through 55n are comparators, reference numeral 56 is a flip-flop and reference numeral 57 is an OR circuit. When the scanning is carried out by the scanning line Si, the counters 51 and 52 count the number of meshes. When the scanning reaches a first black mesh point, the content of the counter 52 (that is the white to black point) is set into the register 24 and when the scanning reaches the point where the black is changed to white, the content of the counter 52 is set into the register 25a. When the scanning reaches the next white to black changing point, the content of the register 25a is reset, and when the scanning reaches the next black to white change point, the content of the register 25a is stored. A similar operation is repeated thereafter.

When the next scanning Si+1 is carried out, a similar operation to that described above is carried out with respect to the registers 24 and 25a. During the scanning Si+1, the content of the register 54a is compared with the content of the counter 52 by the comparator 55a and the content of the flip-flop 56 is stored until the content of the counter 54a coincides with the content of the counter 52. The content of the register 54b is also compared with the content of the counter 52 by the comparator 55b, and the content of the flip-flop 56 is stored until the content of the counter 54b coincides with the content of the counter 52. Therefore, the content of the flip-flop 56 is in a stored condition only between the first and the last black mesh points and, finally, the output as shown in FIG. 5B is obtained.

On the other hand, the output of the subtractor 53 is supplied to registers 25b ... 25n and the outputs Sib, ... Sin are also supplied to the registers 25b, ..., 25n. As a result, the pattern as shown in FIG. 5A is obtained at the output of the OR circuit 57.

The outputs as shown in FIG. 5A and FIG. 5B are supplied to the concavity extraction process. In the concavity extraction process, the observing window as shown in FIG. 6 is used. The observing window is scanned over the pattern as shown in FIG. 5C to check whether the patterns (a) through (e) of FIG. 6 appear or not. When the pattern shown in (a) of FIG. 6 appears, it is recognized that the upper end of the series of the black points is detected. When the pattern shown in (b) appears, it is recognized that the black points are situated in the middle point of the series of the black points and when the pattern shown in (c) appears, it is recognized that the bottom end of the series of the black points is detected.

Figure 7A:
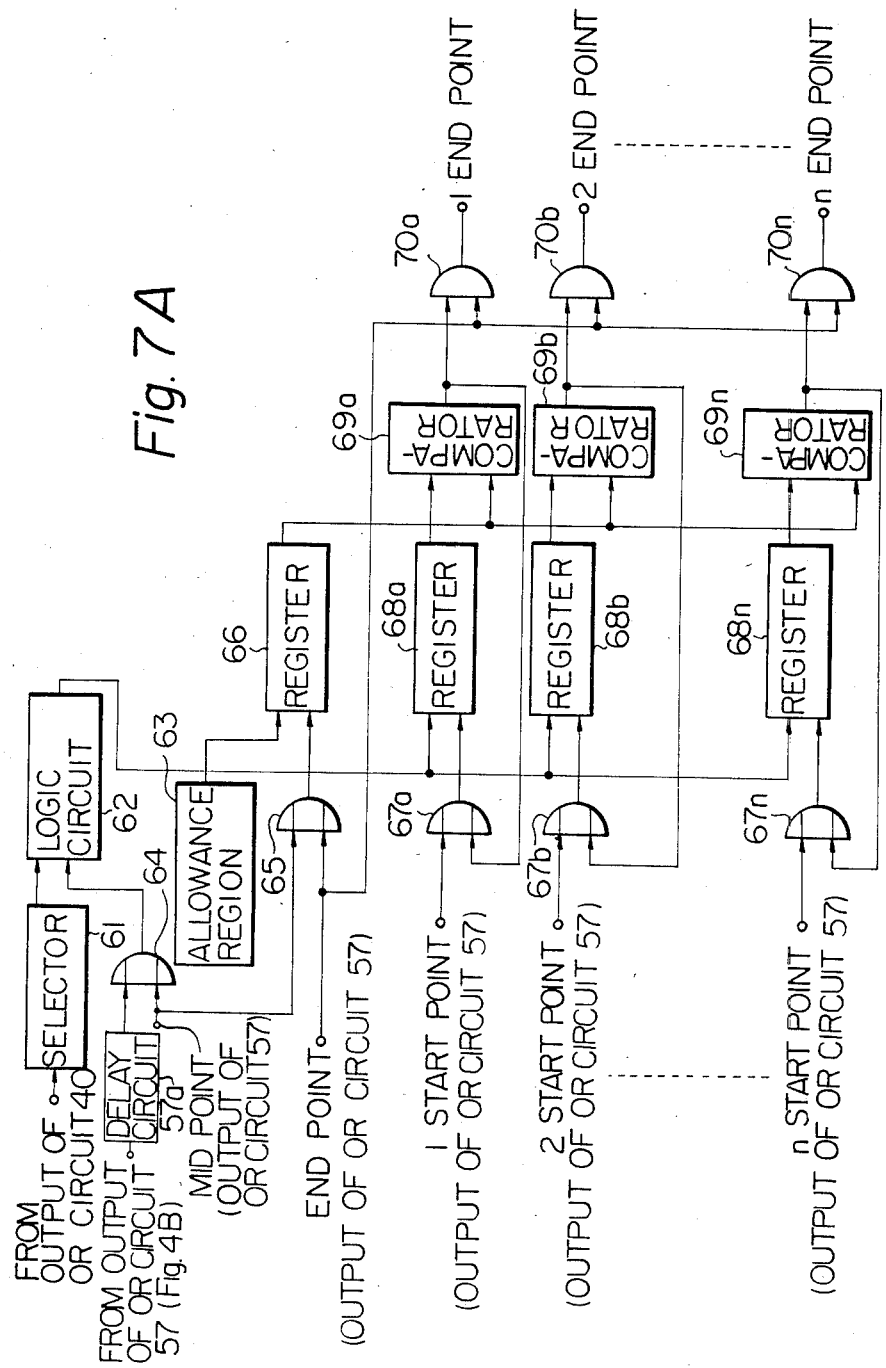
Figure 8A:
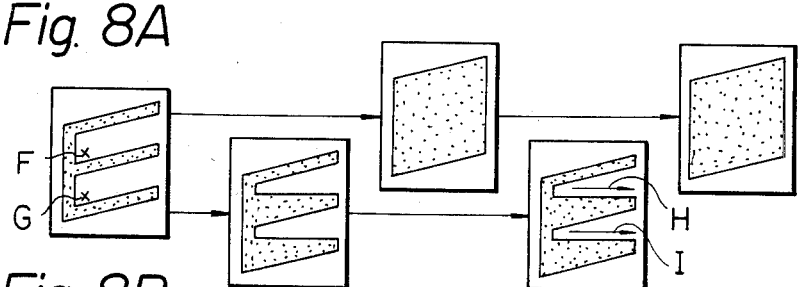
FIGS. 8A, 8B, 8C and 8D are diagrams illustrating the influences of inclinations in the characters to be recognized.
Figure 8B:
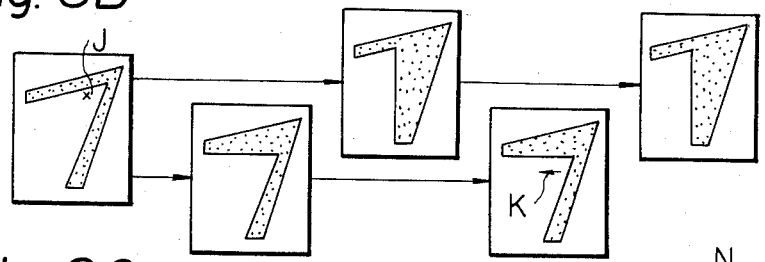
Figure 8C:
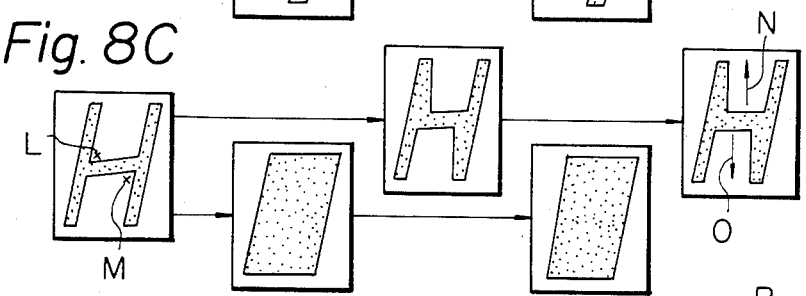
Figure 8D:
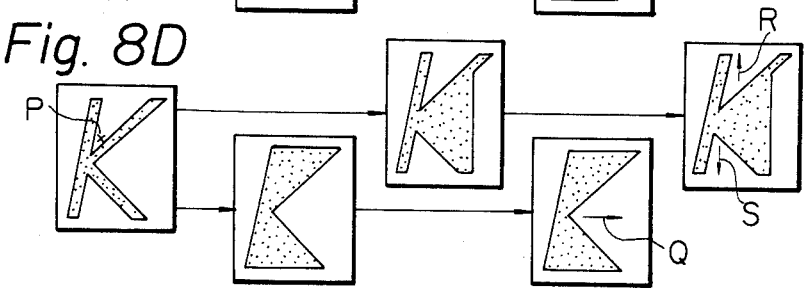

FIG. 7A is one embodiment of the circuit which carries out the concavity extraction process. Referring to FIG. 7A, reference numerals 61, 62 and 63 are, respectively, a selector, a logic circuit and an allowance region register. Reference numerals 64, 65, 67a through 67n are OR circuits, reference numerals 66, 68a through 68n are registers, reference numerals 69a through 69n are comparators and reference numerals 70a through 70n are AND circuits. The output of the OR circuit 57, shown in FIG. 4B (or the output of the OR circuit 40, shown in FIG. 3), is supplied to the selector 61 and the output of the OR circuit 57, shown in FIG. 4B, is supplied to the OR circuits 64 and 65 via a delay circuit 57a as shown in FIG. 7A. When the start point or the middle point of the series of the black points is detected, the coordinate of said point is set in a logic circuit 62. When the middle point or the end point of the series of the black points is detected, the coordinates of the observing window is stored in the allowance region 63. The registers 68a through 68n are registers for storing the coordinates of the black mesh points and are controlled by the OR circuits 67a through 67n, and the content of the logic circuit 62 is set and held. The comparators 69a through 69n compare the content of the registers 68a through 68n with the content of the register 66. When the end point of the series of the black points is extracted, the logic "1" is the output via the AND circuits 70a through 70n.

As shown in FIG. 4B, a reference pattern (as shown in FIG. 5B) is obtained at the first output (the output of the flip-flop circuit 56) and a singular bit pattern (as shown in FIG. 5A) is obtained at the second output (the output of the OR circuit 57). Referring to FIG. 7B, the output of the flip-flop circuit 56 is supplied via a delay circuit 81 to an AND gate 82 and the output of the OR circuit 57 is supplied to the AND gate 82. The output of the AND circuit 82 is stored in registers 83a, 83b, ..., 83n. On the other hand, the timings of the start points and end points are supplied and are set in registers 83a, 83b, ..., 83n and 84a, 84b, ... 84n. The registers 83a, 83b, ..., 83n store a start condition and the registers 84a, 84b, ... 84n store an end condition. Each pair of START 1, END 1; START 2, END 2; ..., START n, END n; is defined by using the circuit shown in FIG. 7C. When the output appears at the output of the circuit (a) of FIG. 7C, it shows that both the upper and lower portions of the white region are closed. When the output appears at the output of the circuit (b) of FIG. 7C it shows that the upper portion is opened and the lower portion is closed. When the output appears at the output of the circuit (c) of FIG. 7C, it shows that the upper portion is closed and the lower portion is opened. When the output appears at the output of the circuit (d) of FIG. 7C, it shows that the both upper and lower portions are opened. By detecting the direction in which the areas of white of said character information are orientated, the character is identified by using the method which was disclosed in "Method for Recognizing the Written Character by Reflecting Method" (The Journal of the Institute of Information Processing of Japan, Vol 17 No. 7, pages 595–602, 1976).

FIGS. 8A through 8D are diagrams illustrating how the influence of an inclination of a character to be recognized is reduced or obviated when the recognition process of the present invention is adopted. In the case of the inclined character "E" shown in FIG. 8A, points F and G positioned in the shadows are completely neglected and only characteristics H and I are extracted. In the case of the inclined character "7" shown in FIG. 8B, the points positioned in the shadows, such as point J, are neglected and the character K is recognized. In the case of the inclined character "H" shown in FIG. 8C, points positioned in the shadows, such as points L and M are neglected and only characters N and O are recognized. In the case of the inclined character "K" shown in FIG. 8D, the points positioned in the shadows, such as point 1, are neglected and characters R and S are recognized.

As will be apparent from the foregoing illustration, according to the present invention, influences of modifications or inclinations in characters to be recognized can be remarkably reduced or obviated, and characters to be correctly recognized, such as characters A, H, I, K, N, O, Q, R and S are recognized correctly and precisely.

What is claimed is:

1. A character processor for a character recognition system which extracts white mesh information points surrounded by black mesh information points of character pattern information and which recognizes characters by determining directions in which said white mesh information opens, said character processor comprising:
   means for receiving character pattern information including black and white mesh points corresponding to horizontal scanning lines of a character and black and white mesh points corresponding to vertical scanning lines of a character; and
   conversion means for converting all white mesh points present between two black mesh points to black mesh points including:
   vertical conversion means for converting all white mesh points of a vertical scanning line between two black mesh points of the vertical scanning line to black mesh points; and
   horizontal conversion means for converting all white mesh points of a horizontal scanning line between two black mesh points of the horizontal scanning line to black mesh points.

2. A character processor according to claim 1, wherein said conversion means comprises:
   input shift register means for holding an n th +1 scanning line of said character pattern information;
   output shift register means, operatively connected to said input shift register means, for holding an n th scanning line of said character pattern information;
   first means, operatively connected to said input shift register means, for detecting the character pattern information sequence of a black mesh point and a white mesh point of the n th scanning line;
   second means, operatively connected to said input shift register means, for detecting a character pattern information sequence of a white mesh point followed by a black mesh point in said n th scanning line;
   third means, operatively connected to said first and to said second means, for detecting that both the character pattern information sequence of a black mesh point followed by a white mesh point, and a white mesh point followed by a black mesh point have been detected by said first and second means;
   fourth means, operatively connected to said output shift register, for detecting a character pattern information sequence of a black mesh point followed by a white mesh point in said n th scanning line when said input shift register is receiving character pattern information for said n th +1 scanning line;
   fifth means, operatively connected to said output shift register means, for detecting character pattern information sequence of a white mesh point followed by a black mesh point in said n th scanning line;
   sixth means, operatively connected to said third, fourth and fifth means, for converting the output of said output shift register means to a logical "1" in response to said character pattern information sequence of a black mesh point followed by a white mesh point detected by said fourth means, and for stopping said conversion of the output of said output shift register means in response to said charater pattern information sequence of a white mesh point followed by a black mesh point being detected by said fifth means.

* * * * *

UNITED STATES PATENT AND TRADEMARK OFFICE
CERTIFICATE OF CORRECTION

PATENT NO. : 4,561,106
DATED : December 24, 1985
INVENTOR(S) : Yoshida et al.

It is certified that error appears in the above-identified patent and that said Letters Patent is hereby corrected as shown below:

Column 7, line 14, "1" should be --P--.

Signed and Sealed this

Eighteenth Day of March 1986

[SEAL]

Attest:

DONALD J. QUIGG

Attesting Officer   Commissioner of Patents and Trademarks